US012671963B2

(12) United States Patent
Chan et al.

(10) Patent No.: US 12,671,963 B2
(45) Date of Patent: Jun. 30, 2026

(54) MANAGING SECURITY-COMPROMISED COMMUNICATION DEVICES IN A TALK GROUP

(71) Applicant: MOTOROLA SOLUTIONS, INC., Chicago, IL (US)

(72) Inventors: Jonathan Chan, Bukit Mertajam (MY); Anoop Sehgal Paras Ram, Ipoh (MY); Eng Hong Ong, Bukit Mertajam (MY); Soo Chait Ewe, Bayan Lepas (MY); Beng Tatt Cheng, Permatang Paluh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 327 days.

(21) Appl. No.: 18/392,138

(22) Filed: Dec. 21, 2023

(65) Prior Publication Data

US 2025/0211947 A1     Jun. 26, 2025

(51) Int. Cl.
H04W 4/08 (2009.01)
H04W 12/08 (2021.01)
H04W 76/45 (2018.01)

(52) U.S. Cl.
CPC ............. H04W 4/08 (2013.01); H04W 12/08 (2013.01); H04W 76/45 (2018.02)

(58) Field of Classification Search
CPC ........ H04W 76/45; H04W 4/08; H04W 12/08
See application file for complete search history.

(56) References Cited

U.S. PATENT DOCUMENTS 9,027,135 B1    5/2015  Aziz
10,412,587 B1    9/2019  Miller et al.
(Continued)

FOREIGN PATENT DOCUMENTS

IN    202241013084 A    3/2022
IN    202331027626 A    4/2023
(Continued)

OTHER PUBLICATIONS

WO 2010009261 A1, Aggrawal et al., Jan. 21, 2010, all (Year: 2010).*
WO 2002129048 A2, Mienville, Dec. 7, 2006, all (Year: 2006).*

*Primary Examiner* — Curtis A Kuntz
(74) *Attorney, Agent, or Firm* — Raguraman Kumaresan

(57)     ABSTRACT
A process of managing security-compromised communication devices in a talk group. In operation, a talk group receives security information associated with communication devices that are each operated by a member of a talk group. When a request to establish a group call between the members of the talk group is received, the talkgroup server determines whether the request is associated with an incident assigned to the members of the talk group. If the request is associated with the incident assigned to the members of the talk group, the talkgroup server restricts or allows the participation of a security-compromised communication device in the group call established between the members of the talk group based at least in part on incident-response communication requirements associated with responding to the incident. If the request is not associated with any incident, the talkgroup server restricts the participation of the security-compromised communication device.

19 Claims, 9 Drawing Sheets

(56)  References Cited

U.S. PATENT DOCUMENTS

| | | | |
|---|---|---|---|
| 10,498,605 | B2 | 12/2019 | Weith et al. |
| 11,611,580 | B1 | 3/2023 | Mehr et al. |
| RE49,634 | E | 8/2023 | Hering et al. |
| 2012/0135711 | A1 * | 5/2012 | Jabara ................ H04N 21/4367 |
| | | | 455/411 |
| 2021/0294895 | A1 * | 9/2021 | Lee ........................ G06F 21/566 |

FOREIGN PATENT DOCUMENTS

| | | | | |
|---|---|---|---|---|
| RU | 2786201 | C1 | 12/2022 | |
| WO | WO-2015085556 | A1 * | 6/2015 | .............. H04W 4/10 |
| WO | WO-2018056847 | A1 * | 3/2018 | ............ H04W 64/00 |

* cited by examiner

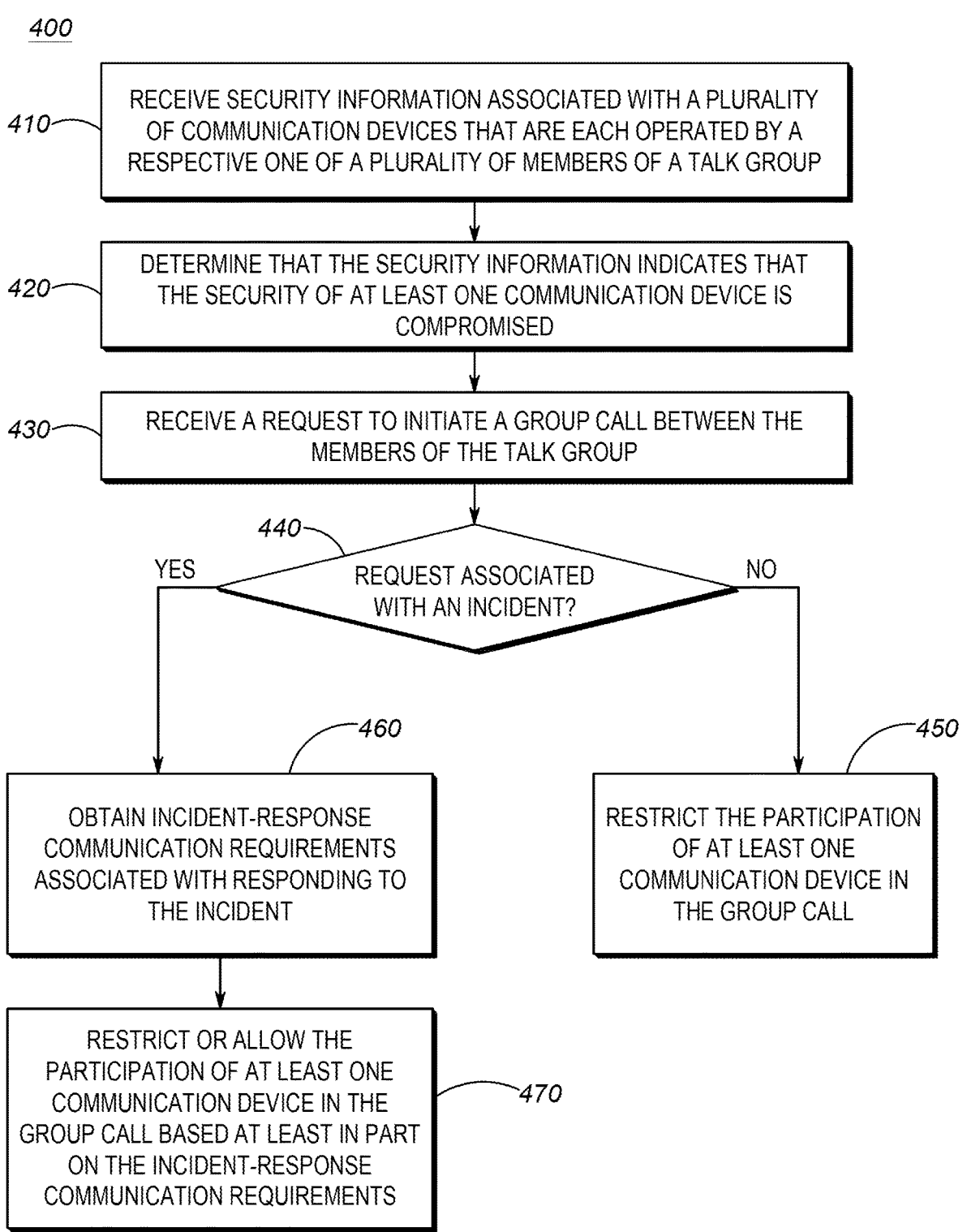

*400*

410 — RECEIVE SECURITY INFORMATION ASSOCIATED WITH A PLURALITY OF COMMUNICATION DEVICES THAT ARE EACH OPERATED BY A RESPECTIVE ONE OF A PLURALITY OF MEMBERS OF A TALK GROUP

420 — DETERMINE THAT THE SECURITY INFORMATION INDICATES THAT THE SECURITY OF AT LEAST ONE COMMUNICATION DEVICE IS COMPROMISED

430 — RECEIVE A REQUEST TO INITIATE A GROUP CALL BETWEEN THE MEMBERS OF THE TALK GROUP

440 — REQUEST ASSOCIATED WITH AN INCIDENT?

YES

NO

460 — OBTAIN INCIDENT-RESPONSE COMMUNICATION REQUIREMENTS ASSOCIATED WITH RESPONDING TO THE INCIDENT

450 — RESTRICT THE PARTICIPATION OF AT LEAST ONE COMMUNICATION DEVICE IN THE GROUP CALL

470 — RESTRICT OR ALLOW THE PARTICIPATION OF AT LEAST ONE COMMUNICATION DEVICE IN THE GROUP CALL BASED AT LEAST IN PART ON THE INCIDENT-RESPONSE COMMUNICATION REQUIREMENTS

*FIG. 4*

| COMPROMISED TALKGROUP MEMBER ROLE | INCIDENT-RESPONSE MEMBER AVAILABILITY REQUIREMENT | INCIDENT-RESPONSE CRITICALITY REQUIREMENT | INCIDENT-RESPONSE CONFIDENTIALITY REQUIREMENT | AUTOMATIC /W INCIDENT-RESPONSE MEMBER AVAILABILITY PRIORITY DECISION | |
|---|---|---|---|---|---|
| EMS | NOT SATISFIED | CRITICAL | NON-CONFIDENTIAL | INCREASE SECURITY COMPROMISE THRESHOLD AND ALLOW OR RESTRICT PARTICIPATION AS A FUNCTION OF INCREASED THRESHOLD | 551 |
| EMS | SATISFIED | CRITICAL | NON-CONFIDENTIAL | ALLOW OR RESTRICT PARTICIPATION AS A FUNCTION OF SECURITY COMPROMISE THRESHOLD | 552 |
| EMS | NOT SATISFIED | CRITICAL | CONFIDENTIAL | INCREASE SECURITY COMPROMISE THRESHOLD AND ALLOW OR RESTRICT PARTICIPATION AS A FUNCTION OF INCREASED THRESHOLD | 553 |
| EMS | SATISFIED | CRITICAL | CONFIDENTIAL | RESTRICT PARTICIPATION | 554 |
| EMS | NOT SATISFIED | NON-CRITICAL | NON-CONFIDENTIAL | ALLOW OR RESTRICT PARTICIPATION AS A FUNCTION OF SECURITY COMPROMISE THRESHOLD | 555 |
| EMS | SATISFIED | NON-CRITICAL | NON-CONFIDENTIAL | RESTRICT PARTICIPATION | 556 |
| EMS | NOT SATISFIED | NON-CRITICAL | CONFIDENTIAL | ALLOW OR RESTRICT PARTICIPATION AS A FUNCTION OF SECURITY COMPROMISE THRESHOLD | 557 |
| EMS | SATISFIED | NON-CRITICAL | CONFIDENTIAL | RESTRICT PARTICIPATION | 558 |

| COMPROMISED TALKGROUP MEMBER ROLE | INCIDENT-RESPONSE MEMBER AVAILABILITY REQUIREMENT | INCIDENT-RESPONSE CRITICALITY REQUIREMENT | INCIDENT-RESPONSE CONFIDENTIALITY REQUIREMENT | AUTOMATIC /W INCIDENT-RESPONSE CRITICALITY PRIORITY DECISION | |
|---|---|---|---|---|---|
| *510* | *520* | *530* | *540* | *560* | |
| EMS | NOT SATISFIED | CRITICAL | NON-CONFIDENTIAL | ALLOW PARTICIPATION | 561 |
| EMS | SATISFIED | CRITICAL | NON-CONFIDENTIAL | ALLOW PARTICIPATION | 562 |
| EMS | NOT SATISFIED | CRITICAL | CONFIDENTIAL | ALLOW PARTICIPATION | 563 |
| EMS | SATISFIED | CRITICAL | CONFIDENTIAL | ALLOW PARTICIPATION | 564 |
| EMS | NOT SATISFIED | NON-CRITICAL | NON-CONFIDENTIAL | ALLOW OR RESTRICT PARTICIPATION AS A FUNCTION OF SECURITY COMPROMISE THRESHOLD | 565 |
| EMS | SATISFIED | NON-CRITICAL | NON-CONFIDENTIAL | RESTRICT PARTICIPATION | 566 |
| EMS | NOT SATISFIED | NON-CRITICAL | CONFIDENTIAL | ALLOW OR RESTRICT PARTICIPATION AS A FUNCTION OF SECURITY COMPROMISE THRESHOLD | 567 |
| EMS | SATISFIED | NON-CRITICAL | CONFIDENTIAL | RESTRICT PARTICIPATION | 568 |

*FIG. 5B*

| COMPROMISED TALKGROUP MEMBER ROLE | INCIDENT-RESPONSE MEMBER AVAILABILITY REQUIREMENT | INCIDENT-RESPONSE CRITICALITY REQUIREMENT | INCIDENT-RESPONSE CONFIDENTIALITY REQUIREMENT | AUTOMATIC /W INCIDENT-RESPONSE CONFIDENTIALITY PRIORITY DECISION | |
|---|---|---|---|---|---|
| _510_ | _520_ | _530_ | _540_ | _570_ | |
| EMS | NOT SATISFIED | CRITICAL | NON-CONFIDENTIAL | INCREASE SECURITY COMPROMISE THRESHOLD AND ALLOW OR RESTRICT PARTICIPATION AS A FUNCTION OF INCREASED THRESHOLD | _571_ |
| EMS | SATISFIED | CRITICAL | NON-CONFIDENTIAL | ALLOW PARTICIPATION | _572_ |
| EMS | NOT SATISFIED | CRITICAL | CONFIDENTIAL | RESTRICT PARTICIPATION | _573_ |
| EMS | SATISFIED | CRITICAL | CONFIDENTIAL | RESTRICT PARTICIPATION | _574_ |
| EMS | NOT SATISFIED | NON-CRITICAL | NON-CONFIDENTIAL | ALLOW OR RESTRICT PARTICIPATION AS A FUNCTION OF SECURITY COMPROMISE THRESHOLD | _575_ |
| EMS | SATISFIED | NON-CRITICAL | NON-CONFIDENTIAL | RESTRICT PARTICIPATION | _576_ |
| EMS | NOT SATISFIED | NON-CRITICAL | CONFIDENTIAL | RESTRICT PARTICIPATION | _577_ |
| EMS | SATISFIED | NON-CRITICAL | CONFIDENTIAL | RESTRICT PARTICIPATION | _578_ |

*FIG. 5C*

| ICON | PRESENCE STATUS |
|---|---|
| 610 | ONLINE/AVAILABLE BUT COMPROMISED |
| | ONLINE/AVAILABLE |
| | DO NOT DISTURB (ONLINE BUT NOT AVAILABLE) |
| | OFFLINE/NOT AVAILABLE |

700

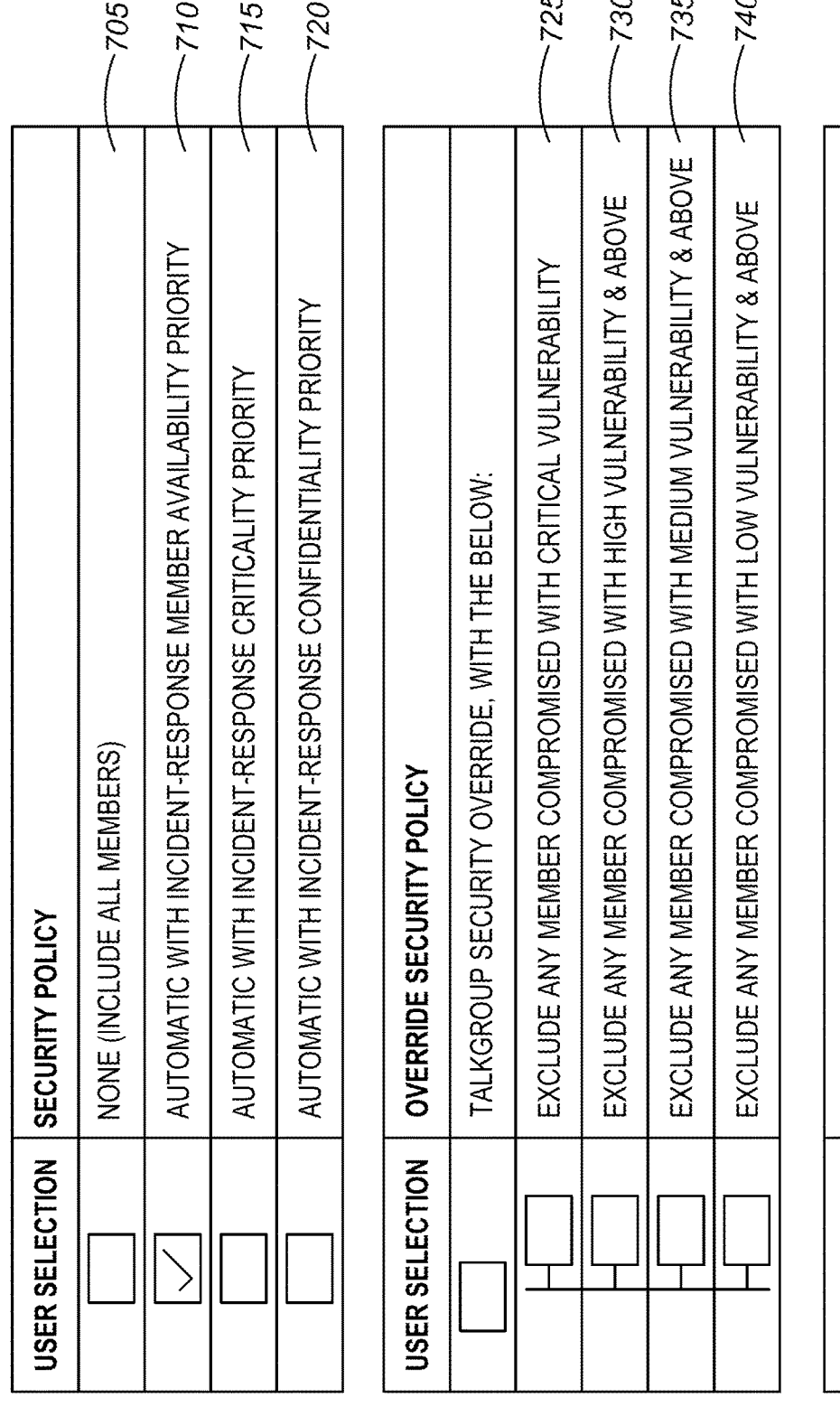

| USER SELECTION | SECURITY POLICY | |
|---|---|---|
| ☐ | NONE (INCLUDE ALL MEMBERS) | 705 |
| ✓ | AUTOMATIC WITH INCIDENT-RESPONSE MEMBER AVAILABILITY PRIORITY | 710 |
| ☐ | AUTOMATIC WITH INCIDENT-RESPONSE CRITICALITY PRIORITY | 715 |
| ☐ | AUTOMATIC WITH INCIDENT-RESPONSE CONFIDENTIALITY PRIORITY | 720 |

| USER SELECTION | OVERRIDE SECURITY POLICY | |
|---|---|---|
| ☐ | TALKGROUP SECURITY OVERRIDE, WITH THE BELOW: | |
| ☐ | EXCLUDE ANY MEMBER COMPROMISED WITH CRITICAL VULNERABILITY | 725 |
| ☐ | EXCLUDE ANY MEMBER COMPROMISED WITH HIGH VULNERABILITY & ABOVE | 730 |
| ☐ | EXCLUDE ANY MEMBER COMPROMISED WITH MEDIUM VULNERABILITY & ABOVE | 735 |
| ☐ | EXCLUDE ANY MEMBER COMPROMISED WITH LOW VULNERABILITY & ABOVE | 740 |

| USER SELECTION | SECURITY POLICY | |
|---|---|---|
| ✓ | ASK BEFORE RESTRICTING PARTICIPATION OF MEMBER(S) IN GROUP CALL | 745 |

*FIG. 7*

MANAGING SECURITY-COMPROMISED COMMUNICATION DEVICES IN A TALK GROUP

BACKGROUND

When an event or incident occurs, such as a fire or accident, numerous different groups may respond to the incident, including for example, first responders such as police, fire, and medical groups and supporting responders such as utility, traffic control, crowd control groups, among others. Groups are conventionally assigned based on function. For example, all members of a particular fire fighter department may be assigned to a same group so that all members of the particular fire fighter department can stay in contact with one another, while avoiding the random transmissions of radio users outside of the local fire fighter group. In some examples, a dispatcher at a dispatch console may control operation of subscriber units associated with responders arriving at the incident scene, and may instruct each subscriber unit or group of subscriber units to manually join one or more groups particularly associated with the incident so that all subscriber units responding to the incident can communicate with one another about the incident. However, when one or more subscriber units in a group are compromised by security vulnerabilities, it poses significant risks to the confidentiality of sensitive incident information exchanged in the group.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 is a flowchart of a process of managing security-compromised communication devices in a talk group in accordance with some embodiments.

FIGS. 5A-5C illustrate examples of security policies used by a talkgroup server for managing a security-compromised communication device in a talk group.

FIG. 7 shows a talkgroup administrator interface configured to select and/or override one or more security policies used by a talkgroup server for managing security-compromised communication devices in a talk group.

Figure 1:
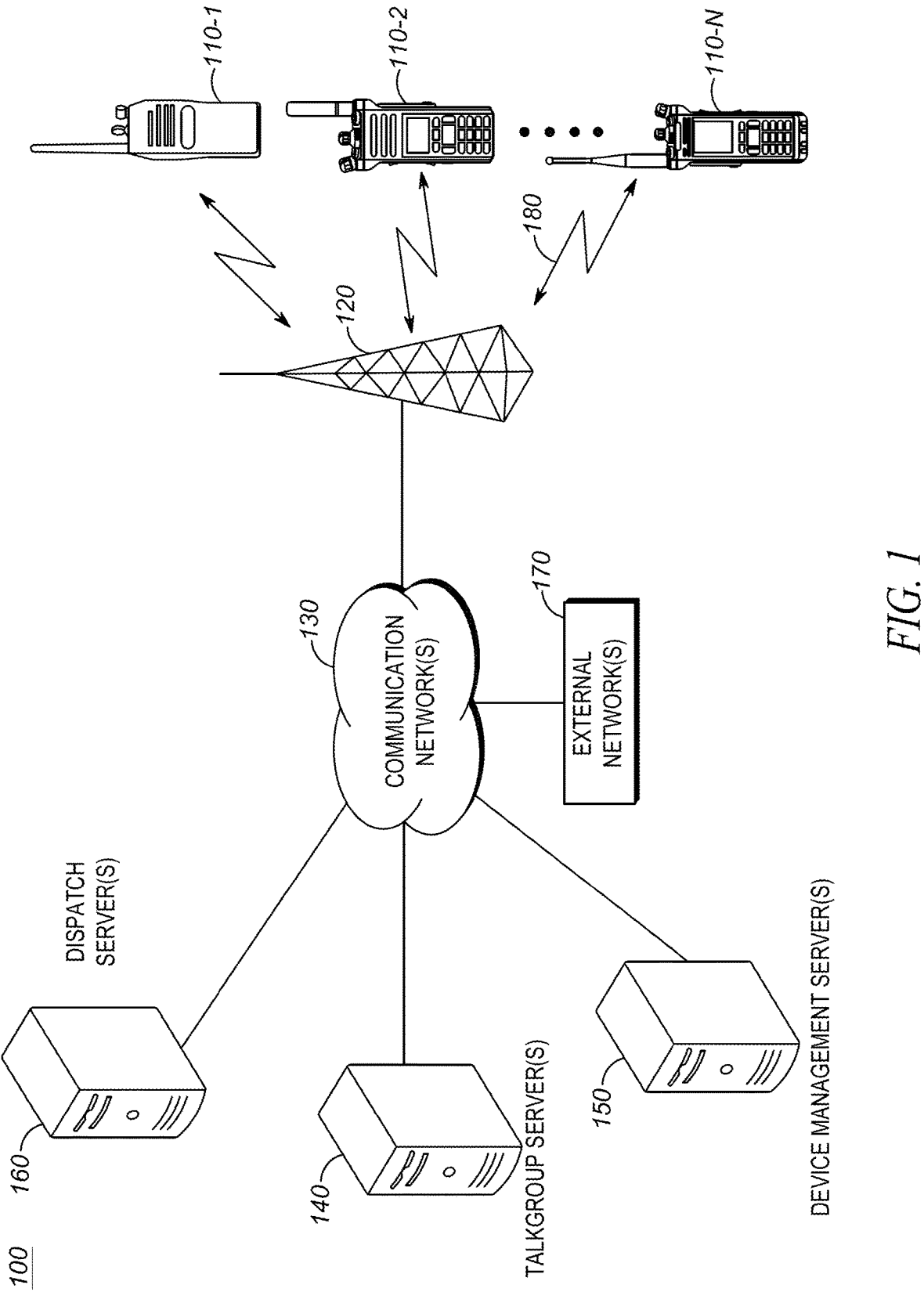
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, there is a significant risk with maintaining confidentiality of incident information exchanged between members of a communication group when communication devices operated by members are compromised by security vulnerabilities. One solution to preserving confidentiality of incident information in such instances is to exclude communication devices compromised by security vulnerabilities from communicating in the talk group. An administrator may manually identify security-compromised communication devices in a group and manage such devices until a time the devices are rectified of any security vulnerabilities. However, manually identifying security-compromised communication devices and managing the participation of such communication devices during group communications particularly established for responding to an incident can lead to oversight or misinterpretation of incident alerts and can result in delayed or ineffective responses to security compromises, leaving the talk group exposed to potential threats. Moreover, excluding all members from participating in communications during responding to an incident may not be feasible in scenarios where an incident response is critical and/or requires participation of a critical number of members or participation of members assigned to roles that are critical for the incident response. Accordingly, there is a need for a technological solution that automatically identifies and manages security-compromised communication devices in a talk group.

One embodiment provides a method of managing security-compromised communication devices in a talk group. The method comprises: receiving, at the talkgroup server, security information associated with a plurality of communication devices that are each operated by a respective one of a plurality of members of a talk group; determining, at the talkgroup server, that the security information indicates that the security of at least one communication device from the plurality of communication devices is compromised; receiving, at the talkgroup server, a request to establish a group call between the members of the talk group; determining, at the talkgroup server, whether the request is associated with an incident assigned to the members of the talk group; in response to determining that the request is associated with the incident assigned to the members of the talk group, obtaining one or more incident-response communication requirements associated with responding to the incident; and restricting or allowing the participation of the at least one communication device in the group call established between the members of the talk group based at least in part on the incident-response communication requirements associated with responding to the incident.

Another embodiment provides a talkgroup server including a communications interface and an electronic processor communicatively coupled to the communications interface. The electronic processor is configured to: receive, via the communications interface, security information associated with a plurality of communication devices that are each operated by a respective one of a plurality of members of a talk group; determine that the security information indicates that the security of at least one communication device from the plurality of communication devices is compromised; receive, via the communications interface, a request to initiate a group call between the members of the talk group; determine whether the request is associated with an incident assigned to the members of the talk group; in response to determining that the request is associated with the incident assigned to the members of the talk group, obtain one or more incident-response communication requirements associated with responding to the incident; and restrict or allow the participation of the at least one communication device in the group call established between the members of the talk group based at least in part on the incident-response communication requirements associated with responding to the incident.

Each of the above-mentioned embodiments will be discussed in more detail below, starting with example system and device architectures of the system in which the embodiments may be practiced, followed by an illustration of processing blocks for achieving an improved technical method, device, and system for managing security-compromised communication devices in a talk group. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including a plurality of communication devices 110-1, 110-2, . . . 110-N, one or more base stations 120, one or more communication networks 130, one or more talkgroup servers 140, one or more device management servers 150, one or more dispatch servers 160, and one or more external networks 170. The plurality of communication devices 110-1 through 110-N can be interchangeably referred to, collectively, as communication devices 110 or devices 110, and generically as a communication device 110 or device 110. The communication device 110 may be carried or worn by respective users, for example, public-safety responders, generically referred to as user(s), member(s), or participant(s) of a talk group. The communication device 110, includes, but is not limited to, a battery-powered portable radio used for narrowband and/or broadband direct-mode or infrastructure communications, a battery-powered radio speaker microphone (RSM) video capture device, and vehicular radios. One or several communication devices 110 within radio coverage of the base station 120 may connect to the communication network 130 using a wireless communication protocol via respective wireless links 180. The communication devices 110 may communicate with each other, and perhaps other devices accessible via other network links, using a group communications protocol over wireless links 180.

Each communication device 110 may be a group communications device, such as a push-to-talk (PTT) device, that is normally maintained in a monitor only mode, and then switches to a transmit-only mode (i.e., half-duplex mode), or transmit and receive mode (i.e., full-duplex mode) upon depression or activation of a PTT input switch. The group communications infrastructure in the communication system 100 allows a single communication device, such as the communication device 110-1, to communicate with one or more other devices (such as communication devices 110-2 . . . 110-N) associated with a particular group of communication devices at the same time. The communication devices 110, base station 120, talkgroup server 140, and/or dispatch server 160 may cooperate to define groups of communication devices and enable the one-to-many group communications feature provided by the communication system 100. In the example shown in FIG. 1, the communication devices 110-1, 110-2 . . . 110-N may each be affiliated with a same talkgroup. Although only few communication devices 110-1, 110-2 . . . 110-N are shown in FIG. 1, the communication system 100 may include additional communication devices that are affiliated with one or more talk groups other than the talk group with which the communication devices 110-1, 110-2, and 110-N are each affiliated. In addition, in one embodiment, the communication devices 110 that are each affiliated with the same talk group may each be deployed for operation in a same area (for example, when users operating the devices 110 are assigned to respond to the same incident).

The communication device 110 or a user operating the communication device 110 may be referred herein as a "member" or "participant" of one or more talkgroups. While the term "talkgroup" is used in this description, it will be understood by those of skill in the art that a term such as "communication group" or "call group" could be used instead, and that the media data being exchanged during a group call among the participants on the group call could be any suitable type of data, such as combination of one or more of audio, image, video, and the like. Further, the term "talkgroup" is used in this disclosure to refer to a particular group of communication devices 110 that operate on a common transmission or reception channel frequency specifically assigned to the talkgroup to participate in a group call associated with the talkgroup. In accordance with some embodiments, each communication device 110 includes a push-to-talk (PTT) input (e.g., a PTT key or button) that when activated by a user (e.g., by pressing the PTT key or button) causes the corresponding device 110 to send a signal to the talkgroup server 140 to request allocation of communication resources (e.g., a channel frequency) for enabling the communication device 110 to transmit signals (e.g., audio communications) to other participants i.e., other devices 110 affiliated with the same talkgroup as the transmitting device 110. A soft push-to-talk (PTT) input may also be provided for this purpose, for example, via a touch interface on a display screen of the communication device 110. In accordance with some embodiments, the communication devices 110 operate in a half-duplex communication mode, where only one communication device 110 operating in a talkgroup is granted a floor (i.e., only one device acquires a transmission channel frequency during a PTT-key-up operation) at any given time to transmit communications. At the time of PTT key-up operation at a transmitting communication device 110, other devices 110 affiliated with the same talkgroup can receive communications from the transmitting communication device 110, but cannot initiate transmission of its own communications unless the floor granted to the transmitting device 110 is revoked and a new floor is granted to another communication device 110 (e.g., in response to a PTT key-up operation initiated at the other device 110).

The talkgroup server 140 may be, for example, a radio controller, push-to-talk (PTT) server, zone controller, mobile management entity (MME), base station controller (BSC), mobile switching center, site controller, call controller, or other network device. While the talkgroup server 140 is illustrated as a separate entity in the system 100, the talkgroup server 140 may be integrated with other devices (such as a zone controller) in a communication network 130 (e.g., within a base station 120 or infrastructure radio access network). The talkgroup server 140 may be configured to provide registration, authentication, encryption, routing, and/or other services to communication devices 110 operating within the coverage area of a base station 120. In accordance with some embodiments, the talkgroup server 140 controls allocations of communication resources (e.g., frequency channels) required to establish a group call between communication devices 110 that are affiliated with the same talkgroup. The talkgroup server 140 additionally tracks or has access to talkgroup subscription information (see element 318 in FIG. 3). The talkgroup subscription information identifies each talkgroup by a unique talkgroup identifier. Each talkgroup is associated with a plurality of call participants or members (i.e., devices 110). Each call participant is identified by a unique identifier associated with a communication device 110 and/or a user operating the communication device 110. For example, a participant associated with a talkgroup may be identified by a device identifier (ID) such as a hardware ID, hardware Media Access Control (MAC) address, Internet Protocol (IP) address, radio ID, International Mobile Subscriber Identity (IMSI), a serial number, user name, user ID, or some other unique identifier that can be used to identify subscribed participant communication devices 110 or users.

A device management server 150 is provided in the communication system 100 to allow third parties such as communication service operators to remotely provision and configure communication devices 110 for the talkgroup members. This includes remote provisioning of new services, configuration, and management of user device parameters and settings, and remote device diagnostics and troubleshooting. In accordance with some embodiments, the device management server 150 is additionally configured to communicate with communication devices 110 (e.g., via a device management client provisioned at a respective one of the communication devices 110) and obtain security information indicating any security vulnerabilities (e.g., malware) detected at the communication devices 110. In these embodiments, the device management server 150 is further configured to forward security information associated with a list of communication devices 110 (e.g., communication devices 110-1, 110-2, . . . 110-N) managed by the device management server 150 to one or more talkgroup servers (e.g., talkgroup server 140) that are responsible for managing one or more talk groups to which the communication devices 150 from the list are affiliated.

A dispatch server 160 may be directly coupled to the talkgroup server 140, or may be indirectly coupled to the talkgroup server 140 via one or more internal or external networks (e.g., communication networks 130). The dispatch server 160 allows an administrator or dispatcher to initiate infrastructure-sourced group communications to communication devices 110 that are affiliated with a same talkgroup, among other features and functions. In accordance with some embodiments, the dispatcher (e.g., via a communication device 110 operated by the dispatcher) may also be added to one or more talk groups as a member of the talk groups, to transmit and/or listen to communications during a group call established between members of the talk groups. In accordance with some embodiments, the dispatch server 160 receives a notification of occurrence of an incident (e.g., a fire incident) in an area (e.g., in a building) and may transmit information associated with the incident to communication devices 110 operated by talk group members (e.g., public-safety personnel) who may be assigned to respond to the incident. In accordance with some embodiments, the dispatch server 160 may assign first responders to respond to the incident and further instruct the talkgroup server 140 to set up a group call among the first responders assigned to the incidents. The dispatch server 160 may also select additional participants for the group call. For example, in case of a fire incident in a building, a dispatcher may, via the dispatch console at the dispatch server 160, may select public-safety personnel from different agencies (e.g., police, fire, medical agencies, etc.) to respond to the incident. In this case, a talk group may be formed with communication devices 110 operated by public-safety personnel from different agencies. In addition, in accordance with some embodiments, the dispatch server 160 may further transmit one or more incident-response communication requirements to the talkgroup server 140. The incident-response communication requirements may be determined based on one or more of the following incident parameters: a type of the incident, a location of the incident, a severity of the incident, number of responders required to respond to the incident, roles, skills, or experience of responders, an urgency or priority with which responders need to be responding to the incident, type of incident-response tasks to be assigned to responders, and other contextual factors such as the need to preserve confidentiality of communications exchanged in relation to responding to the incident. In accordance with some embodiments, the incident-response communication requirements include one or more of an incident-response member availability requirement, incident-response criticality requirement, or an incident-response confidentiality requirement.

In accordance with embodiments, when a talkgroup server 140 receives a request to establish a group call between members of a particular talk group, the talkgroup server 140 decides whether to allow or restrict participation of security-compromised communication devices in the group call. The term "security-compromised communication device" refers to a communication device 110 that has been identified as compromised by one or more security vulnerabilities (e.g., malware). The decision to allow or restrict participation of members of the talk group in a group call is based at least in part on incident-response communication requirements obtained from the dispatch server 160. As an example, the incident-response criticality requirement may indicate that the incident is either critical or non-critical. If the incident is critical, then each member associated with a talk group may have a critical role to play in responding to an incident and therefore the talkgroup server 140 may need to take a decision in favor of allowing a member to participate in a talk group call even when the member is operating a security-compromised communication device. On the other hand, the incident-response confidentiality requirement may indicate whether the incident is of a type that requires preserving confidentiality of communications exchanged during a group call established in response to an incident. In this case, the talkgroup server 140 may need to take a decision to restrict participation of a member operating a security-compromised communication device to preserve confidentiality of communications exchanged during the group call. In accordance with embodiments, the talkgroup server 140 may further weigh or prioritize different incident-response communication requirements differently as defined in the security policy to determine whether to restrict or allow participation of a security-compromised communication device in a group call. As an example, a security policy defined by a dispatcher may require prioritizing the incident-response criticality requirement over the incident-response confidentiality requirement in considering whether to restrict or allow participation of a security-compromised communication device in a group call.

The communication devices 110, talkgroup server 140, device management server 150, and dispatch server 160 may communicate with one another via communication networks 130. The communication networks 130 may include communications infrastructure such as a base station 120 that work in tandem with infrastructure radio access network (RAN) (which in some embodiments include entities such as talkgroup server 140, device management server 150, and dispatch server 160) to provide infrastructure wireless group communication services to communication devices 110 that are within a wireless transmission range of the base station 120. In some embodiments, the communication system 110 may further include additional base stations, base station controllers, router, switches, gateways, and the like, arranged, connected, and programmed to provide wireless service to communication devices 110. The communication system 100 could take the form of a public-safety radio network or commercial broadband network. The communication networks 130 may implement one or more radio access technologies (RATs) and may communicate with devices 110 over respective wireless or air-interface links 180 according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VOIP), an LTE Direct or LTE Device to Device, or a PTT over IP (PoIP) application. While FIG. 1 illustrates an example in which all devices 110 use the same RAT, in other embodiments, each device 110 or set of devices 110 may use different RATs to communicate with one or more same or different infrastructure RAN.

In accordance with some embodiments, the communication system 100 may implement, for example, a narrowband trunked radio communication in which communications devices 110 transmit control and data messages in accordance with an air interface protocol such as that defined by the ETSI Digital Mobile Radio (DMR) or APCO25 standards. In a trunked radio communication system, frequencies are assigned for a talk group on an as-needed basis, and signaling over a control channel is used to direct communication devices to a particular channel to receive a particular group communication. In another embodiment, communications may implement PTT over Cellular (PoC) or PTT over IP (PoIP) broadband architecture in which communication devices 110 transmit control and data messages in accordance with protocol such as real-time transport protocol (RTP) or session initiation protocol (SIP). Other possibilities exist as well.

In accordance with some embodiments, external networks 170 may be made accessible to communication devices 110 via the communication network 130. External networks may include, for example, a public switched telephone network (PSTN), a plain old telephone (POT) system, a wide-area packet-switched network such as the Internet, or another wired or wireless service provider's network, among other possibilities.

Downlink communications over air-interface links 180 may be addressed to communication devices 110 (e.g., multicast or broadcast using an identifier, such as a Subscriber Group ID (SGID), that is associated with a talk group), and/or to one or more single communication devices (e.g., unicast using an identifier, such as a Subscriber Unit Identifier (SUID), that is uniquely associated with that communication device), among other possibilities that are known to those of skill in the art. In addition to infrastructure wireless air-interface links 180 communicatively coupling the devices 110 to the communication networks 130, devices 110 may also maintain ad-hoc or direct-mode ("ad-hoc") air-interface links without any intervening infrastructure between them. For example, a communication device 110 may be wirelessly coupled to another device via a direct-mode air interface link (not shown) in accordance with one or more direct-mode air-interface protocols, such as direct-mode land-mobile-radio (LMR), as long as the devices are within mutual transmission range of one another.

Figure 2:
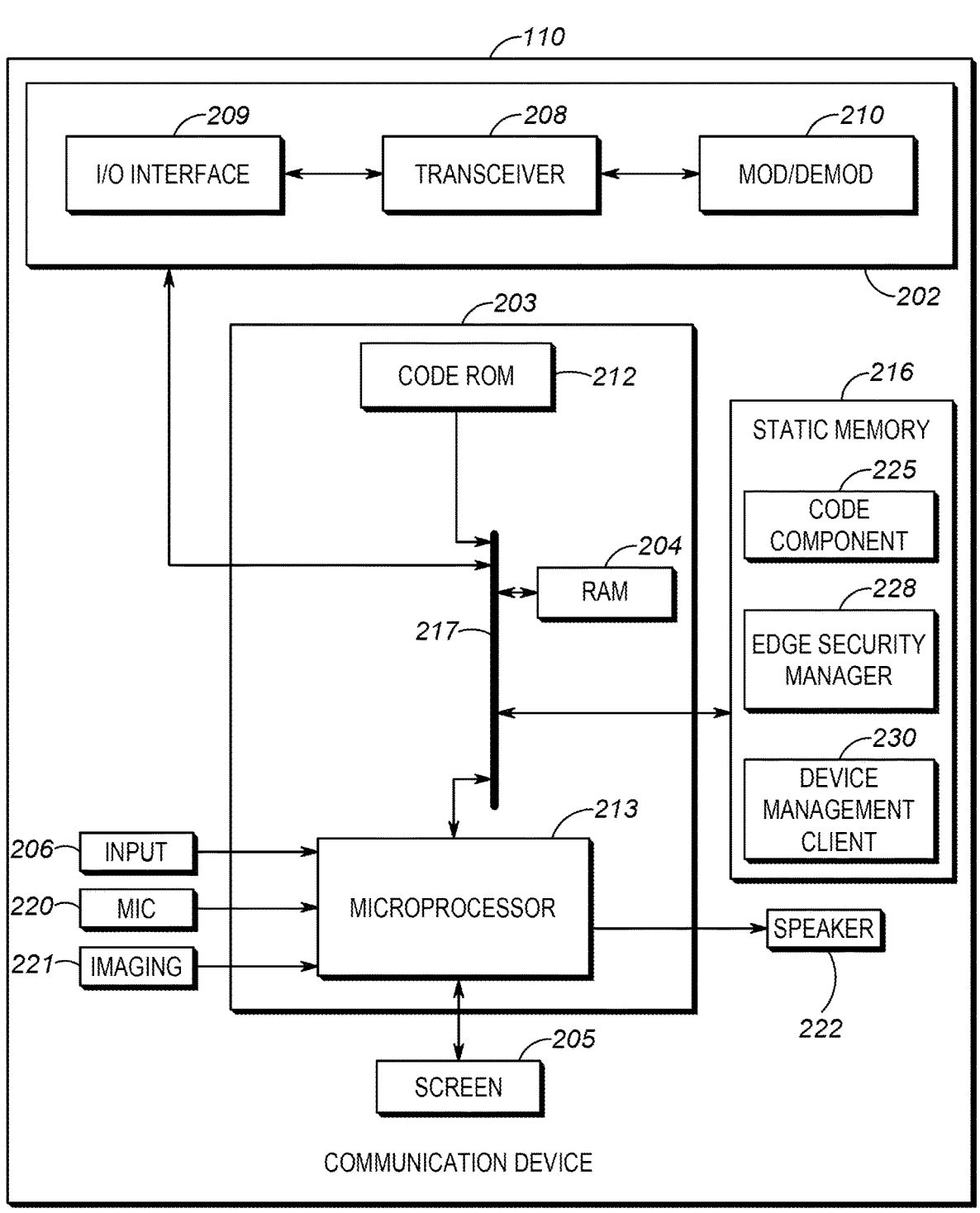
FIG. 2 is a block diagram of a communication device shown in FIG. 1 in accordance with some embodiments.

FIG. 2 is an example functional block diagram of a communication device 110 operating within the communication system 100 in accordance with some embodiments. While FIG. 2 represents a communication device 110 described above with respect to FIG. 1, depending on the type of communication device, the communication device 110 may include fewer or additional components in configurations different from that illustrated in FIG. 2.

As shown in FIG. 2, the communication device 110 includes a radio frequency communications unit 202 coupled to a common data and address bus 217 of a processing unit 203. The communications unit 202 may include one or more wired or wireless input/output (I/O) interfaces 209 that are configurable to communicate with other devices in or communicably coupled to the system 100. The communication device 110 may also include a display screen 205 and an input 206, each coupled to be in communication with processing unit 203. The input 206 may include an alphanumeric physical keypad (or virtual keypad in cooperation with capacitive touch display screen 205) for inputting text for communications. In accordance with some embodiments, the input 206 may include a suitable interface, for example, a hardware or graphical user interface PTT button that functions to activate a transmit function in a half-duplex communication mode, transitioning the communication device 110 (when activated) from a listen-only mode to a transmit-only mode for half-duplex communication. The display screen 205 may further function to display communications received via communications unit 202 from other devices. In accordance with some embodiments, the communication device 110 may display a talkgroup user interface (see FIG. 6) on the display screen 205 indicating a presence status corresponding to different members of a talk group. The display screen 205 may also further display, on the talkgroup user interface, a security status indicating if any member of a talk group is operating a security-compromised communication device and/or if the security-compromised communication device is being restricted (or allowed) to participate in a group call established in response to an incident.

A microphone 220 captures speech input from a user that is further vocoded by processing unit 203 and transmitted as voice, text, or multimedia data by communications unit 202 to other communication devices in the system 100. A communications speaker 222 reproduces audio that is decoded from voice data transmissions received from other communication devices via the communications unit 202. In accordance with some embodiments, the communication device 110 may output audio via the speaker 222 indicating if any member of a talk group is operating a security-compromised communication device and/or if the security-compromised communication device is being restricted (or allowed) to participate in a group call established in response to an incident. The communication device 110 may also further include an imaging component 221 such as a camera.

The processing unit 203 also includes an associated code Read Only Memory (ROM) 212 for storing data for initializing system components and encoding and/or decoding voice or other traffic information (including image data, audio data, video data, text data, control signals, etc.) that may be transmitted or received by the communication device 110. The processing unit 203 may further include a microprocessor or an electronic processor 213 coupled, by the common data and address bus 217, to a random access memory (RAM) 204, and a static memory 216.

The radio frequency communications unit 202 is a combined receiver and transmitter (e.g., transceiver) having a common antenna (not shown). The radio frequency communications unit 202 has a wireless transceiver 208 coupled to the antenna via a radio frequency amplifier. The wireless transceiver 208 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The wireless transceiver 208 is also coupled to a combined modulator/demodulator (MOD/DE-MOD) 210 that is coupled to an encoder/decoder.

The electronic processor 213 has ports for coupling to the display screen 205 and to the input 206. The electronic processor 213 further has ports for coupling to the microphone 220 and to the speaker 222. The electronic processor 213 includes one or more of a microprocessor, a logic circuit, an application-specific integrated circuit (ASIC), a field-programmable gate array (FPGA), or another suitable electronic device. In some embodiments, the static memory 216 may store operating code 225 for the electronic processor 213 that, when executed by the electronic processor 213, performs one or more of the operations set forth in the accompanying figures and text. Static memory 216 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

In accordance with embodiments, the communication device 110 further includes computing resources for detecting one or more security vulnerabilities at the communication device 110. As an example, the static memory 216 may include an edge security manager 228 which includes programming instructions to be executed by the electronic processor 213 for detecting one or more security vulnerabilities. The term "security vulnerability" may refer to any vulnerability that may compromise the security of the communication device 110. For example, the security vulnerabilities may include, for example, a malware, an unintended state, a backdoor that may enable and/or facilitate a security exploit and/or attack, application level distributed denial of service, permanent denial of service, privacy/data/identity theft, stolen device, man-in-the middle attacks, outdated versions of operating systems, expired keys, etc. In accordance with embodiments, the edge security manager 228 may be a trained machine learning model, such as based on supervised and/or unsupervised training using an algorithm such as, but not limited to, multi-class decision tree, deep neural network, or temporal-based algorithms. For example, the edge security manager 228 may detect malware such as virus, worm, trojan horse, spyware, keyloggers, dialers, and/or any unauthorized, malicious, or any non-compliant software installed on the communication device 110. Such malicious software may refer to any code segment, program, or file that may be used to disrupt the operation of the communication device, gather sensitive information, or gain access to communications transmitted and/or received in a group call by the communication device 110. As another example, the edge security manager 228 may detect security vulnerabilities by identifying an exploit within a firmware installed on the communication device 110. In this example, the firmware may facilitate an attack to gain unauthorized access to one or more permissions, functions, and/or data objects of the communication device 110. The edge security manager 228 may scan the firmware for potential exploits and/or identify an attack in progress within the firmware. In accordance with embodiments, the edge security manager 228 may generate security information for a communication device. The security information includes, among other things, a security compromise score determined based on the type, severity, and/or number of security vulnerabilities detected at the communication device 110. The security compromise score may be a number or percentage associated with a confidence in detected security vulnerabilities, or a word describing a level (which may be a range of the number of percentage) of the detected security vulnerabilities (e.g., low, medium, high, or critical). In one embodiment, the security compromise score may be generated in accordance with a common vulnerability scoring system (CVSS) standard. For example, A CVSS score of 0.0 may indicate that a communication device 110 is not compromised by any security vulnerability, a CVSS score of 0.1 through 3.9 may indicate that a communication device 110 is compromised with a security vulnerability with low severity, a CVSS score of 4.0 through 6.9 may indicate that a communication device 110 is compromised with a security vulnerability with medium severity, a CVSS score of 7.0 through 8.9 may indicate that a communication device 110 is compromised with a security vulnerability with high severity, and a CVSS score of 9.0 through 10.0 may indicate that a communication device 110 is compromised with a security vulnerability with critical severity. In one embodiment, the edge security manager 228 sends raw data corresponding to one or more security vulnerabilities detected at a communication device to a cloud analytics server (not shown) for further analysis and in response obtains a security compromise score for the communication device 110 from the cloud analytics server.

In accordance with embodiments, the communication device 110 further includes computing resources for communicating, among other things, the security information (e.g., security compromise score generated at the edge security manager 228) to a device management server 150 (or in one embodiment, directly to the talkgroup server 140) via the communication network(s) 130. As an example, the static memory 216 includes a device management client 230 that contains programming instructions to be executed by the electronic processor 213 for communicating the security information to the device management server 150. The device management client 230 may employ any suitable signaling protocol for transmitting the security information to the device management server 150.

Figure 3:
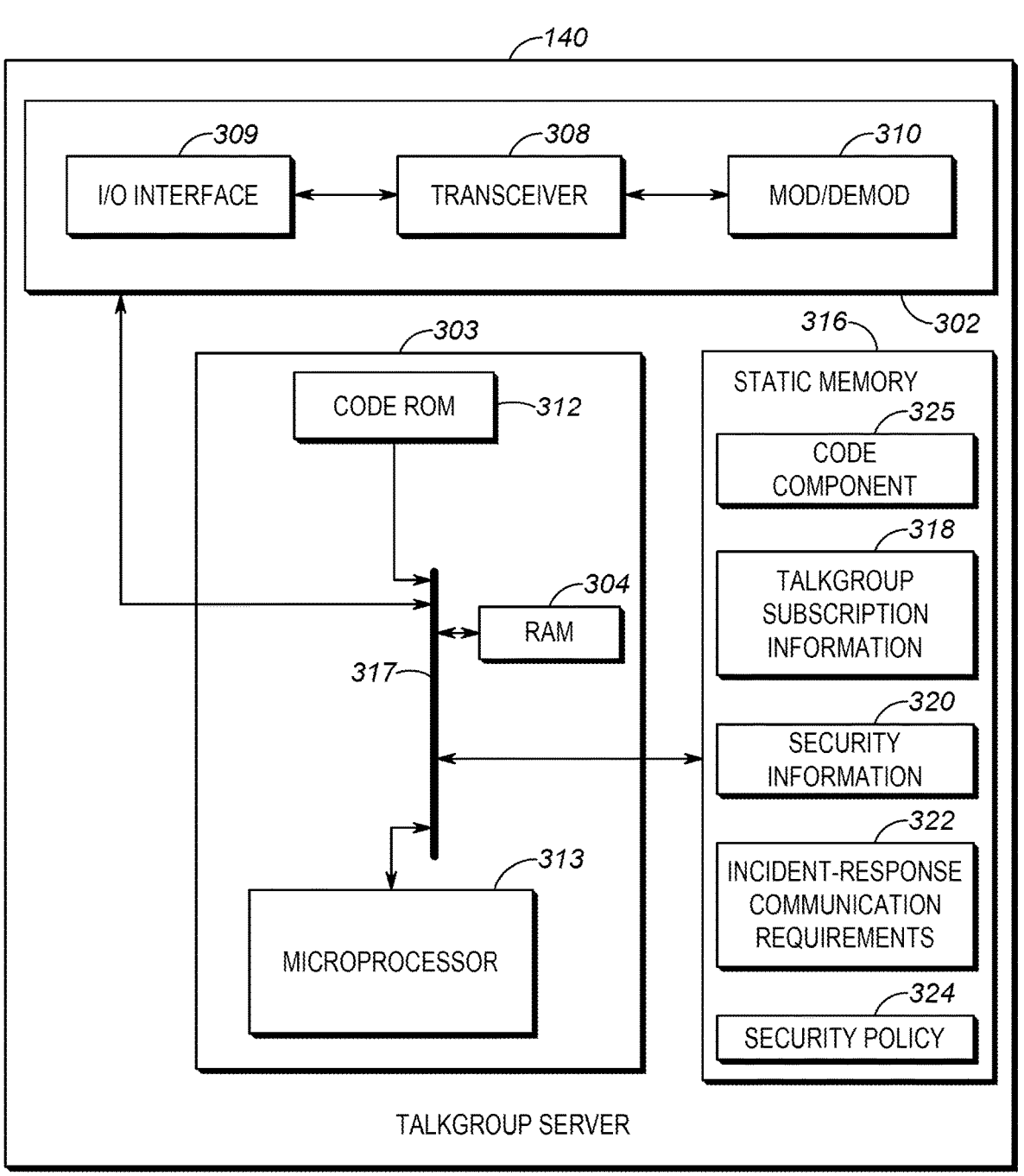
FIG. 3 is a block diagram of a talkgroup server shown in FIG. 1 in accordance with some embodiments.

Now referring to FIG. 3, a schematic diagram illustrates a talkgroup server 140 shown in FIG. 1 in accordance with some embodiments. The talkgroup server 140 may be a standalone device or alternatively embodied in another infrastructure server such as the device management server 150 or the dispatch server 160 within the system 100. In one embodiment, one or more of the functions of the talkgroup server 140 may be implemented at one or more of the communication devices 110 initiating a group call. In one embodiment, the talkgroup server 140 may be implemented as a distributed computing device across two or more of the foregoing (or multiple of the same type of one of the foregoing) and linked via a wired and/or wireless communication link(s). The talkgroup server 140 may also be implemented in a cloud computing platform. Depending on the type of the server, the talkgroup server 140 may include fewer or additional components in configurations different from that illustrated in FIG. 3.

As shown in FIG. 3, the talkgroup server 140 includes a communications unit or communications interface 302 coupled to a common data and address bus 317 of the processing unit 303. The communications unit 302 may include one or more wired or wireless input/output (I/O) interfaces 309 that are configurable to communicate with communication devices 110, device management server 150, dispatch server 160, and/or with other devices in or communicably coupled to the system 100. The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE or 5G transceiver, and/or other similar type of wireless transceiver configurable to communicate via a wireless radio network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the processing unit 303.

The processing unit 303 may include an encoder/decoder with an associated code Read Only Memory (ROM) 312 for storing data for initializing system components, and encoding and/or decoding voice, data, control, or other signals that may be transmitted or received between the talkgroup server 140 and other devices in the system 100. The processing unit 303 includes an electronic processor or microprocessor 313 coupled, by the common data and address bus 317, to a Random Access Memory (RAM) 304, and a static memory 316.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Static memory 316 stores operating code 325 for the electronic processor 313 that, when executed, performs one or more of the functions set forth in the figures and accompanying text.

Static memory 216 may store (or talkgroup server 140 has access to, via the communications unit 302) talk group subscription information 318, security information 320, incident-response communication requirements 322, and one or more security policies 324. The talk group subscription information 318 identifies each talk group managed by the talkgroup server 140 by a unique talk group identifier. The talk group subscription information 318 also includes information identifying each member (e.g., a device identifier of a communication device 110 and/or a unique ID or name assigned to a user or member operating the communication device 110) associated with a given group. The security information 320 includes security information obtained corresponding to each communication device 110 associated with a given talk group from the device management server 150. The security information 320 includes security compromise score and/or information about security vulnerabilities detected corresponding to each communication device 110 associated with a given talk group.

The incident-response communication requirements 322 includes one or more of incident-response member availability, incident-response criticality or incident-response confidentiality requirements associated with responding to an incident that is assigned to members of a given talk group. The incident-response communication requirements 322 may vary for each given talk group depending on the type, severity, and other contextual incident factors associated with an incident currently assigned to members of the talk group. In accordance with embodiments, the talkgroup server 140 manages (e.g., allows or restricts participation in a group call) security-compromised communication devices in a talk group based at least in part on the incident-response communication requirements 322 obtained from the dispatch center 160. In some cases, the incident-response communication requirements 322 may not be available or stored at the talkgroup server 140, for example, when members of the talk groups managed by the talkgroup server 140 are not currently assigned to respond to any incidents. In these cases, in the absence of specific incident-response communication requirements, the talkgroup server 140 may automatically restrict participation of a security-compromised communication device in a group call.

The talkgroup server 140 may further store one or more security policies 324 to be used in combination with the incident-response communication requirements to make a decision on whether to restrict or allow participation of a security-compromised communication device in a group call established between members of a talk group. One or more security policies 324 may be predefined and/or input by a dispatcher or an administrator of the talkgroup server 140. In accordance with some embodiments, a security policy 324 defines which one of the incident-response criticality requirement, incident-response member availability requirement, or incident-response confidentiality requirements needs to be prioritized (or assigned a higher weight) in determining whether to restrict or allow participation of a security-compromised communication device in a group call. As an example, a security policy 324 may favor allowing participation of a security-compromised communication device in a group call when the incident-response criticality requirement requires an urgent response. As another example, a security policy 324 may favor restricting participation of a security-compromised communication device in a group call when another member with a similar role and operating a non-security-compromised communication device (i.e., a communication device identified as not compromised by any security vulnerability) is available to participate in the talk group. As another example, a security policy 324 may favor restricting participation of a security-compromised communication device in a group call when the incident-response confidentiality requirement is high (or exceeds a threshold). In accordance with embodiments, the talkgroup server 140 automatically manages security-compromised communication devices in a talk group in accordance with a security policy that may be selected automatically (or manually by an administrator of a talk group) from a list of security policies stored in the static memory 216 of the talkgroup server 140. In one embodiment, the talkgroup server 140 provides a user interface (see FIG. 7) to enable an administrator of a talk group to select a security policy or override a security policy previously or automatically selected by the talkgroup server 140.

Turning now to FIG. 4, a flowchart diagram illustrates a process 400 for managing security-compromised communication devices in a talk group. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. A talkgroup server 140 as set forth in FIG. 3 executes process 400 in accordance with some embodiments. The talkgroup server 140 may execute the process 400 at power-on, at some predetermined periodic time period thereafter, in response to a trigger raised locally at the talkgroup server 140 via an internal process (e.g., in response to detecting that a group call is to be established between members of a talk group after an occurrence of an incident), or via an input interface (e.g., a user such as a dispatcher enabling a particular feature associated with the process 400 by activating a button at the talkgroup server 140 and/or at the dispatch server 160), among other possibilities.

The process 400 of FIG. 4 need not be performed in the exact sequence as shown and likewise various blocks may be performed in different order or alternatively in parallel rather than in sequence. Accordingly, the elements are referred to herein as "blocks" rather than "steps." The process 400 may be implemented on variations of the system 100 of FIG. 1 as well.

Process 400 begins at block 410 when the talkgroup server 140 receives security information associated with a plurality of communication devices 110 (e.g., communication devices 110-1, 110-2 . . . 110-N) that are each operated by a respective one of a plurality of users or members of a talk group. In accordance with some embodiments, the talkgroup server 140 receives security information for each communication device 110 associated with a talk group from a device management server 150 that manages the communication device 110. The security information includes one or more of a security compromise score (e.g., CVSS score) or a list of security vulnerabilities detected at the communication device 110.

At block 420, the talkgroup server 140 determines that the security information indicates that the security of at least one communication device 110 (e.g., communication device 110-2) from the plurality of communication devices 110 is compromised. The at least one communication device is interchangeably referred to herein as a security-compromised communication device. In one embodiment, the talkgroup server 140 determines that a communication device is compromised when the CVSS score is 0.1 or more.

At block 430, the talkgroup server 140 receives a request to establish a group call between the members of the talk group. The talkgroup server 140 may receive the request from one or more members of the talk group via their respectively operated communication devices 110. The talkgroup server 140 may also receive the request from a dispatcher via the dispatch server 160. In one embodiment, an electronic request to establish a talk group call is automatically sent to the talkgroup server 140 in response to detecting an occurrence of an incident (e.g., via a 911 call). The request may include information about one or more of: an incident identifier, a type of the incident, a location of the incident, a severity of the incident, a number of responders required to respond to the incident, corresponding roles, skills, or experience required from the responders, an urgency or priority with which responders need to be responding to the incident, and other contextual factors such as the need to preserve confidentiality of communications exchanged in relation to the incident.

At block 440, the talkgroup server 140 determines whether the request is associated with any incident that is assigned to the members of the talk group. In accordance with some embodiments, the term "any incident" refers to any incident that requires an active or ongoing response by one or more public-safety personnel assigned to an incident. In one embodiment, the talkgroup server 140 determines that the request is associated with an incident based on incident information such as the incident identifier included in the request. In accordance with some embodiments, any request to establish a group call in relation to a closed incident or an incident that does not require any active or ongoing response is not considered as a request associated with any incident.

If the talkgroup server 140 determines that the request is not associated with any incident (e.g., not related to any incident that requires active response by public-safety personnel) that is assigned to the members of the talk group, at block 450, the talkgroup server 140 restricts the participation of the at least one communication device 110 in the group call established between the members of the talk group.

In accordance with some embodiments, the talkgroup server 140 restricts participation of a security-compromised communication device (i.e., the at least one communication device 110) in the group call by disabling one or more talkgroup services. As an example, the security-compromised communication device may be restricted from transmitting and/or receiving communications (e.g., media streams such as text, audio, or video) on a communication channel assigned to the talk group. The talkgroup server 140 may also mute the communication channel or disconnect the communication paths associated with the security-compromised communication device to cause suppression of playback of communications transmitted on the communication channel assigned to the talk group.

If, at block 440, the talkgroup server 140 determines that the request to establish a group call is associated with an incident assigned to the members of the talk group, the talkgroup server 140 further obtains, at block 460, one or more incident-response communication requirements associated with responding to the incident. In one embodiment, the talkgroup server 140 obtains incident-response communication requirements including one or more of incident-response member availability requirement, incident-response criticality requirement, or incident-response confidentiality requirement from the dispatch server 160.

At block 470, the talkgroup server 140 restricts or allows the participation of the at least one communication device (i.e., security-compromised communication device(s)) in the group call based at least in part on the incident-response communication requirements. As described previously, if the talkgroup server 140 decides to restrict participation of a security-compromised communication device in a group call, the talkgroup server 140 may restrict the security-compromised communication device from transmitting and/or receiving communications on a communication channel assigned to the talk group. Alternatively, if the talkgroup server 140 decides to allow participation of a security-compromised communication device in a group call, the talkgroup server 140 allows the security-compromised communication to transmit and/or receive communications on a communication channel assigned to the talk group. In accordance with embodiments, the talkgroup server 140 repeats the feature described at block 470 to restrict or allow participation of each communication device that has been identified as a security-compromised communication device at block 420.

In accordance with some embodiments, the talkgroup server 140 further relies on a security policy that may prioritize a particular one of an incident-response member availability-requirement, an incident-response criticality requirement, or an incident-response confidentiality requirement to determine whether to restrict or allow the participation of the security-compromised communication device. FIGS. 5A-5C illustrate examples of security policies that can be used by a talkgroup server 140 for managing a security-compromised communication device in a talk group.

The security policies shown in FIG. 5A-5C require the talkgroup server 140 to make a decision about participation of a security-compromised communication device based on a role 510 of a member operating the security-compromised communication device, an incident-response member availability requirement 520, an incident-response criticality requirement 530, and incident-response confidentiality requirement 540. As illustrated in FIGS. 5A-5C, the talkgroup server 140 identifies a role 510 of a member operating a security-compromised communication device. As an example, the role of a member operating a security-compromised communication device (e.g., device 110-2) may be identified as an emergency medical services (EMS) officer. In this case, the talkgroup server 140 next determines if the members of the talk group includes a second member (e.g., a member operating a device 110-1 or 110-N in the talk group) who satisfies an incident-response member availability requirement 520. In accordance with some embodiments, the incident-response member availability requirement 520 requires that the (ii) the second member is available to participate in the group call, (iii) the security information indicates that the security of at least one other communication device operated by the second member is not compromised (e.g., with a CVSS score of 0.0), and (iv) the second member is assigned to a second role for responding to the incident that is same or equivalent as the role of the member operating the security-compromised communication device. To determine availability of a second member, the talkgroup server 140 may retrieve a presence status corresponding to other members associated with the talk group. The presence status for each member may indicate whether there is an alternative member operating a non-compromised communication device who is available (i.e., not currently assigned to and/or responding to an active or ongoing incident) and/or is online (i.e., connected to the network) to participate in a group call. In one embodiment, the incident-response member availability requirement 520 may require the second member to additionally or alternatively satisfy the following requirements: (i) the second member should be located in proximity or within a predefined distance from a current or last known position of the member operating the security-compromised communication device, (ii) the second member has a health status (e.g., as retrieved from sensor data) indicating that the second member is not injured or is otherwise able to respond to the incident, or (iii) the second member supervises or is in a higher chain-of-command for the incident-response.

The talkgroup server 140 also determines whether the incident-response criticality requirement 530 indicates a critical incident response or a non-critical incident response and further whether the incident-response confidentiality requirement 540 indicates a confidential incident response or non-confidential incident response.

FIG. 5A illustrates decisions made in accordance with a security policy 550 that requires the talkgroup server 140 to restrict or allow participation of a security-compromised communication device in a group call by prioritizing incident-response member availability requirement 520 (i.e., availability of another member with similar role and operating a non-compromised communication device) over other incident-response requirements such as the incident-response criticality requirement 530 and the incident-response confidentiality requirement 540.

If the talkgroup server 140 determines that (i) the plurality of members does not include a second member satisfying the incident-response member availability requirement 520, (ii) the incident-response criticality requirement 530 indicates a critical incident response and (iii) the incident-response confidentiality requirement 540 indicates a non-confidential response, then in a security policy 550 requiring prioritization of incident-response member availability requirement 520, the talkgroup server 140 increases a security compromise threshold prior to making a decision 551 on whether to allow or restrict participation of the security-compromised communication device in the group call. The security compromise threshold may correspond to a standard threshold that is used by the talkgroup server 150 at all other times (e.g., when the group call is not associated with an incident or when there are no-incident response requirements associated with responding to an incident) to determine whether to allow or restrict participation of the security-compromised device in a group call. As an example, the standard security compromise threshold may be set to 'Medium' (e.g., a maximum CVSS score of '6.9'). In this example, the talkgroup server 140 may allow only security-compromised communication devices with a security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0). On the other hand, if the talkgroup server 140 decides to use an increased security compromise threshold (as shown at 551), the talkgroup server 140 allows the participation of the security-compromised communication device in the group call when the security information for the security-compromised communication device includes a security compromise score that does not exceed the increased security compromise threshold. Alternatively, the talkgroup server 140 restricts the participation of the security-compromised communication device in the group call when the security information for the security-compromised communication device includes a security compromise score that exceeds the increased predetermined security threshold. As an example, an increased security compromise threshold may be set at 'High' (e.g., maximum CVSS score of '8.9'). In this example, the talkgroup server 140 allows only security-compromised communication devices with security compromise score indicating severity rating of 'Low', 'Medium', and 'High' (i.e., CVSS score of 8.9 and below). Further, in this example, the talkgroup server 140 restricts security-compromised communication devices with security compromise score indicating severity rating of 'Critical' (i.e., CVSS score of 9.0 and above).

If the talkgroup server 140 determines that (i) the plurality of members includes a second member satisfying the incident-response member availability requirement 520, (ii) the incident-response criticality requirement 530 indicates a critical incident response, and (iii) the incident-response confidentiality requirement 540 indicates a non-confidential response, then in a security policy 550 requiring prioritization of incident-response member availability requirement 520, the talkgroup server 140 makes a decision 552 to either allow or restrict participation of the security-compromised communication device in the group call as a function of the standard security compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members does not include a second member satisfying the incident-response member availability requirement 520, (ii) the incident-response criticality requirement 530 indicates a critical incident response, and (ii) the incident-response confidentiality requirement 540 indicates a confidential response, then in a security policy 550 requiring prioritization of incident-response member availability requirement 520, the talkgroup server 140 increases the standard security compromise threshold prior to making a decision 553 on whether to allow or restrict participation of the security compromised communication device in the group call. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0). On the other hand, if the talkgroup server 140 decides to use an increased security compromise threshold (as shown at 553), the talkgroup server 140 allows the participation of the security-compromised communication device in the group call when the security information for the security-compromised communication device includes a security compromise score that does not exceed the increased security compromise threshold. Alternatively, the talkgroup server 140 restricts the participation of the security-compromised communication device in the group call when the security information for the security-compromised communication device includes a security compromise score that exceeds the increased predetermined security threshold. As an example, an increased security compromise threshold may be set at 'High' (e.g., maximum CVSS score of '8.9'). In this example, the talkgroup server 140 allows only security-compromised communication devices with security compromise score indicating severity rating of 'Low', 'Medium', and 'High' (i.e., CVSS score of 8.9 and below). Further, in this example, the talkgroup server restricts security-compromised communication devices with security compromise score indicating severity rating of 'Critical' (i.e., CVSS score of 9.0 and above).

If the talkgroup server 140 determines that (i) the plurality of members includes a second member satisfying the incident-response member availability requirement 520, (ii) the incident-response criticality requirement 530 indicates a critical incident response and (ii) the incident-response confidentiality requirement 540 indicates a confidential response, then in a security policy 550 requiring prioritization of incident-response member availability requirement 520, the talkgroup server 140 makes a decision 554 to restrict participation of the security-compromised communication device in the group call. In this case, the talkgroup server 140 automatically takes a decision to restrict participation of the security-compromised communication device in the group call without further considering the standard security compromise threshold because another member with similar role (as the member operating the security-compromised device) and operating a non-compromised communication device is available to participate in the group call.

If the talkgroup server 140 determines that (i) the plurality of members does not include a second member satisfying the incident-response member availability requirement 520, (ii) the incident-response criticality requirement 530 indicates a non-critical incident response and (ii) the incident-response confidentiality requirement 540 indicates a non-confidential response, then in a security policy 550 requiring prioritization of incident-response member availability requirement 520, the talkgroup server 140 makes a decision 555 to either allow or restrict participation of the security-compromised communication device in the group call as a function of the standard security-compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a non-confidential response, then in a security policy 550 requiring prioritization of incident-response member availability requirement 520, the talkgroup server 140 makes a decision 556 to restrict participation of the security-compromised communication device in the group call. In this case, the talkgroup server 140 automatically decides 556 to restrict participation of the security-compromised communication device in the group call without further considering the standard security compromise threshold because another member with similar role (as the member operating the security-compromised communication device) and operating a non-compromised communication device is available to participate in the group call.

If the talkgroup server 140 determines that (i) the plurality of members does not include a second member satisfying the incident-response member availability requirement 520, (ii) the incident-response criticality requirement 530 indicates a non-critical incident response and (ii) the incident-response confidentiality requirement 540 indicates a confidential response, then in a security policy 550 requiring prioritization of incident-response member availability requirement 520, the talkgroup server 140 makes a decision 557 to either allow or restrict participation of the security-compromised communication device in the group call as a function of the standard security-compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a confidential response, then in a security policy 550 requiring prioritization of incident-response member availability requirement 520, the talkgroup server 140 makes a decision 558 to restrict participation of the security-compromised communication device in the group call. In this case, the talkgroup server 140 automatically decides to restrict participation of the security-compromised communication device in the group call without further considering the standard security compromise threshold because another member with similar role (as the member operating the security-compromised communication device) and operating a non-compromised communication device is available to participate in the group call.

FIG. 5B illustrates decisions made in accordance with a security policy 560 that requires the talkgroup server 140 to restrict or allow participation of a security-compromised communication device in a group call by prioritizing incident-response criticality requirement 530 over other incident-response requirements such as the incident-response member availability requirement 520 and the incident-response confidentiality requirement 540.

If the talkgroup server 140 determines that (i) the plurality of members does not include a second member satisfying the incident-response member availability requirement 520, (ii) the incident-response criticality requirement 530 indicates a critical incident response and (ii) the incident-response confidentiality requirement 540 indicates a non-confidential response, then in a security policy 560 requiring prioritization of incident-response criticality requirement 530, the talkgroup server 140 makes a decision 561 to allow participation of the security-compromised communication device in the group call. In this case, the talkgroup server 140 automatically decides 561 to allow participation of the security-compromised communication device in the group call without further considering the standard security compromise threshold because the criticality of the incident-response favors including the security-compromised device in the group call even though there may be risk with respect to preserving the confidentiality of communications made in the group call.

If the talkgroup server 140 determines that (i) the plurality of members includes a second member satisfying the incident-response member availability requirement 520, (ii) the incident-response criticality requirement 530 indicates a critical incident response and (ii) the incident-response confidentiality requirement 540 indicates a non-confidential response, then in a security policy 560 requiring prioritization of incident-response criticality requirement 530, the talkgroup server 140 makes a decision 562 to allow participation of the security-compromised communication device in the group call. In this case, the talkgroup server 140 automatically decides 562 to allow participation of the security-compromised communication device in the group call without further considering the standard security compromise threshold because the criticality of incident-response favors including the security-compromised device in the group call even though there may be risk with respect to preserving the confidentiality of communications made in the group call.

If the talkgroup server 140 determines that (i) the plurality of members does not include a second member satisfying the incident-response member availability requirement 520, (ii) the incident-response criticality requirement 530 indicates a critical incident response and (ii) the incident-response confidentiality requirement 540 indicates a confidential response, then in a security policy 560 requiring prioritization of incident-response criticality requirement 530, the talkgroup server 140 makes a decision 563 to allow participation of the security-compromised communication device in the group call. In this case, the talkgroup server 140 automatically decides 563 to allow participation of the security-compromised communication device in the group call without further considering the standard security compromise threshold because the criticality of incident-response favors including the security-compromised device in the group call even though there may be risk with respect to preserving the confidentiality of communications made in the group call.

If the talkgroup server 140 determines that (i) the plurality of members includes a second member satisfying the incident-response member availability requirement 520, (ii) the incident-response criticality requirement 530 indicates a critical incident response and (ii) the incident-response confidentiality requirement 540 indicates a confidential response, then in a security policy 560 requiring prioritization of incident-response criticality requirement 530, the talkgroup server 140 makes a decision 564 to allow participation of the security-compromised communication device in the group call. In this case, the talkgroup server 140 automatically decides 564 to allow participation of the security-compromised communication device in the group call without further considering the standard security compromise threshold because the criticality of incident-response favors including the security-compromised device in the group call even though there may be risk with respect to preserving the confidentiality of communications made in the group call.

If the talkgroup server 140 determines that (i) the plurality of members does not include a second member satisfying the incident-response member availability requirement 520, (ii) the incident-response criticality requirement 530 indicates a non-critical incident response and (ii) the incident-response confidentiality requirement 540 indicates a non-confidential response, then in a security policy 550 requiring prioritization of incident-response criticality requirement 530, the talkgroup server 140 makes a decision 565 to either allow or restrict participation of the security-compromised communication device in the group call as a function of the standard security-compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a non-confidential response, then in a security policy 560 requiring prioritization of incident-response criticality requirement 530, the talkgroup server 140 makes a decision 566 to restrict participation of the security-compromised communication device in the group call. In this case, the talkgroup server 140 automatically decides 566 to restrict participation of the security-compromised communication device in the group call without further considering the standard security compromise threshold because there is another member with similar role and operating a non-compromised communication device is available to participate in the group call and further because the incident-response is neither critical nor it requires confidential communications.

If the talkgroup server 140 determines that (i) the plurality of members does not include a second member satisfying the incident-response member availability requirement 520, (ii) the incident-response criticality requirement 530 indicates a non-critical incident response and (ii) the incident-response confidentiality requirement 540 indicates a confidential response, then in a security policy 560 requiring prioritization of incident-response criticality requirement 530, the talkgroup server 140 makes a decision 567 to either allow or restrict participation of the security-compromised communication device in the group call as a function of the standard security-compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a confidential response, then in a security policy 560 requiring prioritization of incident-response criticality requirement 530, the talkgroup server 140 makes a decision 568 to restrict participation of the security-compromised communication device in the group call. In this case, the talkgroup server 140 automatically decides 568 to restrict participation of the security-compromised communication device in the group call without further considering the standard security compromise threshold because there is another member with similar role and operating a non-compromised communication device is available to participate in the group call and further because the incident-response is neither critical nor it requires confidential communications.

FIG. 5C illustrates decisions made in accordance with a security policy 570 that requires the talkgroup server 140 to restrict or allow participation of a security-compromised communication device in a group call by prioritizing incident-response confidentiality requirement 540 over other incident-response requirements such as the incident-response member availability requirement 520 and the incident-response criticality requirement 530.

If the talkgroup server 140 determines that (i) the plurality of members does not include a second member satisfying the incident-response member availability requirement 520, (ii) the incident-response criticality requirement 530 indicates a critical incident response and (ii) the incident-response confidentiality requirement 540 indicates a non-confidential response, then in a security policy 570 requiring prioritization of incident-response confidentiality requirement 540, the talkgroup server 140 increases a standard security compromise threshold prior to making a decision 571 on whether to allow or restrict participation of the security compromised communication device in the group call. As an example, an increased security compromise threshold may be set at 'High' (e.g., maximum CVSS score of '8.9'). In this example, the talkgroup server 140 allows only security-compromised communication devices with security compromise score indicating severity rating of 'Low', 'Medium', and 'High' (i.e., CVSS score of 8.9 and below). Further, in this example, the talkgroup server 140 restricts security-compromised communication devices with security compromise score indicating severity rating of 'Critical' (i.e., CVSS score of 9.0 and above).

If the talkgroup server 140 determines that (i) the plurality of members includes a second member satisfying the incident-response member availability requirement 520, (ii) the incident-response criticality requirement 530 indicates a critical incident response and (ii) the incident-response confidentiality requirement 540 indicates a non-confidential response, then in a security policy 570 requiring prioritization of incident-response confidentiality requirement 540, the talkgroup server 140 makes a decision 572 to allow participation of the security-compromised communication device in the group call. In this case, the talkgroup server 140 automatically decides 572 to allow participation of the security-compromised communication device in the group call without further considering the standard security compromise threshold because the incident-response does not require maintaining confidentiality of communications exchanged in the group call.

If the talkgroup server 140 determines that (i) the plurality of members does not include a second member satisfying the incident-response member availability requirement 520, (ii) the incident-response criticality requirement 530 indicates a critical incident response and (ii) the incident-response confidentiality requirement 540 indicates a confidential response, then in a security policy 570 requiring prioritization of incident-response confidentiality requirement 540, the talkgroup server 140 makes a decision 573 to restrict participation of the security-compromised communication device in the group call. In this case, the talkgroup server 140 automatically decides 573 to restrict participation of the security-compromised communication device in the group call without further considering the standard security compromise threshold because the incident-response confidentiality requirement 540 is prioritized over the incident-response criticality requirement 530.

If the talkgroup server 140 determines that (i) the plurality of members includes a second member satisfying the incident-response member availability requirement 520, (ii) the incident-response criticality requirement 530 indicates a critical incident response and (ii) the incident-response confidentiality requirement 540 indicates a confidential response, then in a security policy 570 requiring prioritization of incident-response confidentiality requirement 540, the talkgroup server 140 makes a decision 574 to restrict participation of the security-compromised communication device in the group call. In this case, the talkgroup server 140 automatically decides to restrict participation of the security-compromised communication device in the group call without further considering the standard security compromise threshold because the incident-response confidentiality requirement 540 is prioritized over the incident-response criticality requirement 530.

If the talkgroup server 140 determines that (i) plurality of members does not include a second member satisfying the incident-response member availability requirement 520, (ii) the incident-response criticality requirement 530 indicates a non-critical incident response and (ii) the incident-response confidentiality requirement 540 indicates a non-confidential response, then in a security policy 570 requiring prioritization of incident-response confidentiality requirement 540, the talkgroup server 140 makes a decision 575 to either allow or restrict participation of the security-compromised communication device in the group call as a function of the standard security-compromise threshold. As an example, the standard security compromise threshold may be set to 'Medium' (e.g., a maximum CVSS score of '6.9'). In this example, the talkgroup server 140 may allow only security-compromised communication devices with security compromise score indicating severity rating of 'Low' (i.e., CVSS score of 3.9 and below) or 'Medium' (i.e., a CVSS score of 4.0 through 6.9). Further, in this case, the talkgroup server 140 restricts participation of security-compromised communication devices with security compromise score indicating severity rating of 'High' (i.e., CVSS score of 7.0 through 8.9) and 'Critical' (i.e., CVSS score of 9.0 through 10.0).

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a non-confidential response, then in a security policy 570 requiring prioritization of incident-response confidentiality requirement 540, the talkgroup server 140 makes a decision 576 to restrict participation of the security-compromised communication device in the group call. In this case, the talkgroup server 140 automatically decides 576 to restrict participation of the security-compromised communication device in the group call without further considering the standard security compromise threshold because another member with similar role and operating a non-compromised communication device is available to participate in the group call and further because the incident-response is neither critical nor it requires confidential communications.

If the talkgroup server 140 determines that (i) the plurality of members does not include a second member satisfying the incident-response member availability requirement 520, (ii) the incident-response criticality requirement 530 indicates a non-critical incident response and (ii) the incident-response confidentiality requirement 540 indicates a confidential response, then in a security policy 570 requiring prioritization of incident-response confidentiality requirement 540, the talkgroup server 140 makes a decision 577 to restrict participation of the security-compromised communication device in the group call. In this case, the talkgroup server 140 automatically decides 577 to restrict participation of the security-compromised communication device in the group call without further considering the standard security compromise threshold because the incident-response requires preserving confidentiality of communications exchanged over the group call.

If the talkgroup server 140 determines that (i) the plurality of members includes a second member satisfying the incident-response member availability requirement 520, (ii) the incident-response criticality requirement 530 indicates a non-critical incident response and (ii) the incident-response confidentiality requirement 540 indicates a confidential response, then in a security policy 570 requiring prioritization of incident-response confidentiality requirement 540, the talkgroup server 140 makes a decision 578 to restrict participation of the security-compromised communication device in the group call. In this case, the talkgroup server 140 automatically decides 578 to restrict participation of the security-compromised communication device in the group call without further considering the standard security compromise threshold because the incident-response requires preserving confidentiality of communications exchanged over the group call.

Figure 6:
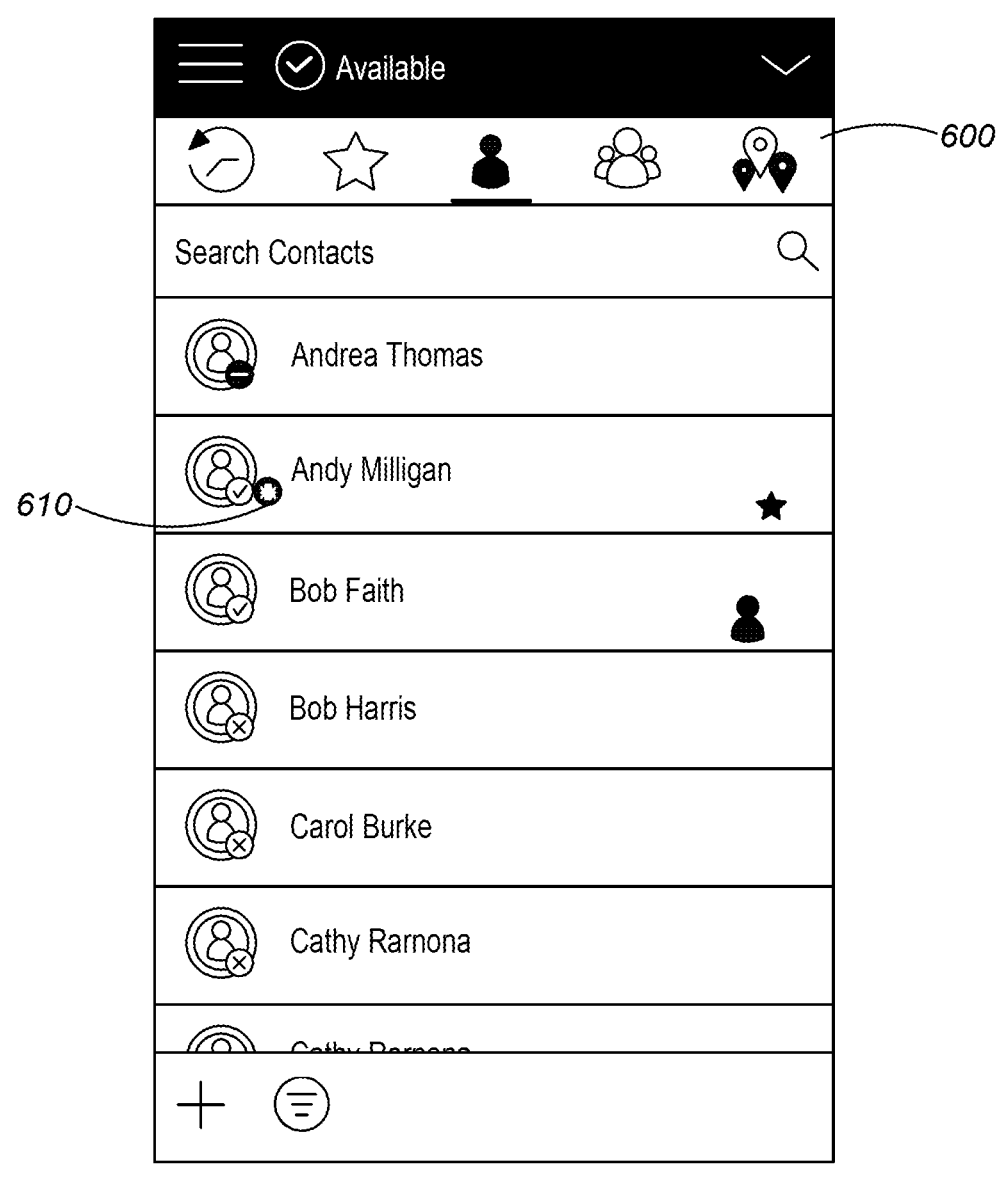
FIG. 6 shows a talkgroup user interface indicating status of communication devices associated with the same talk group.

FIG. 6 shows a talkgroup user interface 600 indicating a status of communication devices that are associated with the same talk group. The talkgroup user interface 600 may be generated and displayed on a display screen (e.g., display screen 205 shown in FIG. 2) provided at each communication device 110 operated by a member of a talk group. The talkgroup user interface 600 displays a presence status corresponding to each member indicating whether the member is available and/or is online to participate in a group call. In addition, if any member in a talk group is identified as operating a security-compromised communication, the talkgroup user interface 600 provides a security status corresponding to each communication device. In the example shown in FIG. 6, the talkgroup user interface 600 provides an indicator (e.g., icon 610 as shown in FIG. 6) to visually indicate that the member is operating a security-compromised communication device. In accordance with embodiments, a similar talkgroup user interface may be generated and displayed on a communication device 110 operated by a dispatcher or administrator to enable them to manually allow or restrict participation of security-compromised communication devices in a group call.

FIG. 7 shows a talkgroup administrator interface 700 configured to select and/or override one or more security policies used by a talkgroup server 140 for managing security-compromised communication devices in a talk group. The talkgroup administrator interface 700 may be generated and displayed on a display screen provided at or coupled to a talkgroup server 140. The talkgroup administrator interface 700 allows a user (i.e., an administrator or a dispatcher) to select a security policy that should be applied by the talkgroup server 140 to decide whether to restrict or allow security-compromised communication devices in a group call. For example, a user could select a first security policy option 705 to automatically include all members in a group call. In other words, if the security policy option 705 is selected, the talkgroup server 140 does not restrict participation of a security-compromised communication device in a group call. Alternatively, the user could select a second security policy option 710, a third security policy option 715, or a fourth security policy option 720 to enable the talkgroup server to automatically make a decision on restricting or allowing participation of security-compromised communication devices in a group call. If the second security policy option 710 is selected, the talkgroup server 140 manages participation of a security-compromised communication device by prioritizing incident-response member availability requirement 520 over incident-response criticality requirement 530 or incident-response confidentiality requirement 540 in accordance with the example described with reference to FIG. 5A. If the second security policy option 715 is selected, the talkgroup server 140 manages participation of a security-compromised communication device by prioritizing incident-response criticality requirement 530 over incident-response member availability requirement 520 or incident-response confidentiality requirement 540 in accordance with the example described with reference to FIG. 5B. If the third security policy option 720 is selected, the talkgroup server 140 manages participation of a security-compromised communication device by prioritizing incident-response confidentiality requirement 540 over incident-response member availability requirement 520 or incident-response confidentiality requirement 540 in accordance with the example described with reference to FIG. 5C.

The talk group administrator user interface 700 further allows a user to override a security policy option (e.g., security policy options 705, 710, 715, 720) that was previously selected and/or used as a default security policy option by the talkgroup server 140. When a user (e.g., dispatcher or administrator) selects a first security override option 725, the talkgroup server 140 automatically excludes (or restricts access to one or more talkgroup services) participation of any member operating a security-compromised communication device with a security compromise score indicating severity rating of 'Critical' (i.e., CVSS score of 9.0 and above). In other words, in this case, the talkgroup server 140 allows participation of security-compromised communication devices with security compromise score indicating severity rating of 'Low', 'Medium', and 'High' (i.e., CVSS score of 8.9 and below) in the group call.

When the user selects a second security override option 730, the talkgroup server 140 automatically excludes (or restricts access to one or more talkgroup services) participation of any member operating a security-compromised communication device with a security compromise score indicating severity rating of 'High' or 'Critical' (i.e., CVSS score of 7.0 and above). In other words, in this case, the talkgroup server 140 allows participation of security-compromised communication devices with security compromise score indicating severity rating of 'Low' and 'Medium' (i.e., CVSS score of 6.9 and below) in the group call.

When the user selects a third security override option 735, the talkgroup server 140 automatically excludes (or restricts access to one or more talkgroup services) participation of any member operating a security-compromised communication device with a security compromise score indicating severity rating of 'Medium', "High', or 'Critical' (i.e., CVSS score of 4.0 and above). In other words, in this case, the talkgroup server 140 allows participation of security-compromised communication devices with security compromise score indicating severity rating of 'Low' (i.e., CVSS score of 3.9 and below) in the group call.

When the user selects a fourth security override option 740, the talkgroup server 140 automatically excludes (or restricts access to one or more talkgroup services) participation of any member operating a security-compromised communication device with a security compromise score indicating severity rating of 'Low', 'Medium', 'High', 'Low' (i.e., CVSS score of 0.1 and above). In other words, in this case, the talkgroup server 140 allows participation of only non-compromised security communication devices (i.e., CVSS score of 0.0) in the group call.

As shown in FIG. 7, the talkgroup administrator interface 700 further includes a confirmation option 745. When the confirmation option 745 is selected by the user, the talkgroup server 140 executes a decision (e.g., decision made in accordance with a security policy shown in FIG. 5A, 5B, or 5C) to allow or restrict the participation of a security-compromised communication device only after receiving a confirmation from a user (e.g., dispatcher, administrator, or another talk group member operating a non-compromised communication device). In accordance with some embodiments, when the confirmation option 745 is selected, the talkgroup server 140 may generate a visual or audio prompt (via a corresponding display screen or speaker) requesting the user to authorize talkgroup server's decision to restrict (or allow) participation of one or more security-compromised communication devices in a group call. The talkgroup server 140 then waits for a response (e.g., via speech, text, or gesture input) from the user. The talkgroup server 140 in some embodiments uses a natural language processing engine to automatically process a response received from the user. If the talkgroup server 140 receives a response indicating an authorization from the user to execute the talkgroup server's decision to restrict (or allow) participation of the security-compromised communication devices, then the talkgroup server 140 proceeds to restrict (or allow) participation of the security-compromised communication devices in the group call. The talkgroup server 140 then establishes a group call between members of the talk group in accordance with the user authorization received corresponding to restricting (or allowing) participation of the security-compromised communication devices in the group call. In one embodiment, the talkgroup server 140 restricts the participation of a security-compromised group call by restricting one or more talkgroup features such as by restricting the communication device from transmitting and/or receiving communications in a group call, automatically muting a speaker component at the communication device, or refraining from granting a PTT floor to the communication device in response to detecting a PTT input.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of managing security-compromised communication devices in a talk group, the method comprising:

receiving, at a talkgroup server, security information associated with a plurality of communication devices that are each operated by a respective one of a plurality of members of a talk group;

determining, at the talkgroup server, that the security information indicates that the security of at least one communication device from the plurality of communication devices is compromised;

receiving, at the talkgroup server, a request to establish a group call between the members of the talk group;

determining, at the talkgroup server, whether the request is associated with any incident assigned to the members of the talk group;

in response to determining that the request is associated with an incident assigned to the members of the talk group, obtaining, at the talkgroup server, one or more incident-response communication requirements associated with responding to the incident, wherein the incident-response communication requirements include one or more of an incident-response criticality requirement, an incident-response confidentiality requirement, or an incident-response member availability requirement;

retrieving a security policy indicating that a particular one of the incident-response criticality requirement, the incident-response confidentiality requirement, or the incident-response member availability requirement should be prioritized over other incident-response communication requirements in determining whether to restrict or allow participation of security-compromised communication devices in a group call; and restricting or allowing the participation of the at least one communication device in the group call established between the members of the talk group based at least in part on the incident-response communication requirements associated with responding to the incident and further based at least in part on prioritizing the particular one of the incident-response criticality requirement, the incident-response confidentiality requirement, or the incident-response member availability requirement over the other incident-response communication requirements.

2. The method of claim 1, further comprising:

in response to determining that the request is not associated with any incident assigned to the members of the talk group, restricting the participation of the at least one communication device in the group call established between the members of the talk group.

3. The method of claim 1, wherein restricting or allowing comprises restricting the participation of the at least one communication device in the group call, the method comprising:

restricting the at least one communication device from one or more of transmitting or receiving communications during the group call.

4. The method of claim 1, wherein restricting or allowing comprises allowing the participation of the at least one communication device in the group call, the method comprising:

allowing the at least one communication device to one or more of transmit or receive communications during the group call.

5. The method of claim 1, further comprising:

transmitting a notification to the plurality of communication devices indicating that the security of the at least one communication device is compromised.

6. The method of claim 1, further comprising:

identifying that the at least one communication device is operated by a first member from the plurality of members of the talk group, the first member being assigned to a first role for responding to the incident;

determining, at the talkgroup server, whether the plurality of members of the talk group includes a second member satisfying the incident-response member availability requirement, the incident-response member availability requirement requiring that (i) the second member is available to participate in the group call, (ii) the security information indicates that the security of at least one other communication device operated by the second member is not compromised, and (iii) the second member is assigned to a second role that is equivalent to the first role for responding to the incident; and wherein restricting or allowing the participation of the at least one communication device in the group call is based at least in part on the second member satisfying the incident-response member availability requirement.

7. The method of claim 1, further comprising:
determining that the (i) the incident-response criticality requirement indicates a non-critical incident response and (ii) the plurality of members includes a second member satisfying the incident-response member availability requirement,
wherein restricting or allowing comprises restricting the participation of the at least one communication device in the group call.

8. The method of claim 1, further comprising:
determining that the (i) the incident-response criticality requirement indicates a non-critical incident response, (ii) the incident-response confidentiality requirement indicates either a confidential incident response or a non-confidential incident response, and (iii) the plurality of members does not include a second member satisfying the incident-response member availability requirement;
wherein restricting or allowing comprises one of:
    restricting the participation of the at least one communication device in the group call when the security information for the at least one communication device includes a security compromise score that exceeds a security compromise threshold, or
    allowing the participation of the at least one communication device in the group call when the security compromise score does not exceed the security compromise threshold.

9. The method of claim 1, further comprising:
determining that the (i) the incident-response criticality requirement indicates a non-critical incident response, (ii) the incident-response confidentiality requirement indicates a confidential incident response, and (iii) the plurality of members does not include a second member satisfying the incident-response member availability requirement;
wherein restricting or allowing comprises restricting the participation of the at least one communication device in the group call whether or not the security information for the at least one communication device includes a security compromise score exceeding a security compromise threshold.

10. The method of claim 1, further comprising:
determining that the (i) the incident-response criticality requirement indicates a critical incident response, (ii) the incident-response confidentiality requirement indicates a non-confidential incident response, and (iii) the plurality of members includes a second member satisfying the incident-response member availability requirement;
wherein restricting or allowing comprises allowing the participation of the at least one communication device in the group call whether or not the security information for the at least one communication device includes a security compromise score exceeding a security compromise threshold.

11. The method of claim 1, further comprising:
determining that the (i) the incident-response criticality requirement indicates a critical incident response, (ii) the incident-response confidentiality requirement indicates a non-confidential incident response, and (iii) the plurality of members includes a second member satisfying the incident-response member availability requirement;

wherein restricting or allowing comprises one of:
    restricting the participation of the at least one communication device in the group call when the security information for the at least one communication device includes a security compromise score that exceeds a security compromise threshold, or
    allowing the participation of the at least one communication device in the group call when the security compromise score does not exceed the security compromise threshold.

12. The method of claim 1, further comprising:
determining that the (i) the incident-response criticality requirement indicates a critical incident response, (ii) the incident-response confidentiality requirement indicates a confidential incident response, and (iii) the plurality of members includes a second member satisfying the incident-response member availability requirement;
wherein restricting or allowing comprises restricting the participation of the at least one communication device in the group call whether or not the security information for the at least one communication device includes a security compromise score exceeding a security compromise threshold.

13. The method of claim 1, further comprising:
determining that the (i) the incident-response criticality requirement indicates a critical incident response, (ii) the incident-response confidentiality requirement indicates a confidential incident response, and (iii) the plurality of members includes a second member satisfying the incident-response member availability requirement;
wherein restricting or allowing comprises allowing the participation of the at least one communication device in the group call whether or not the security information for the at least one communication device includes a security compromise score exceeding a security compromise threshold.

14. The method of claim 1, comprising:
determining that the (i) the incident-response criticality requirement indicates a critical incident response, (ii) the incident-response confidentiality requirement indicates a confidential incident response, and (iii) the plurality of members does not include a second member satisfying the incident-response member availability requirement;
wherein restricting or allowing comprises restricting the participation of the at least one communication device in the group call whether or not the security information for the at least one communication device includes a security compromise score exceeding a security compromise threshold.

15. The method of claim 1, comprising:
determining that the (i) the incident-response criticality requirement indicates a critical incident response, (ii) the incident-response confidentiality requirement indicates a confidential incident response or non-confidential response, and (iii) the plurality of members does not include a second member satisfying the incident-response member availability requirement;
wherein restricting or allowing comprises allowing the participation of the at least one communication device in the group call whether or not the security information for the at least one communication device includes a security compromise score exceeding a security compromise threshold.

16. The method of claim 1, further comprising:

determining that the (i) the incident-response criticality requirement indicates a critical incident response, (ii) the incident-response confidentiality requirement indicates a confidential incident response or a non-confidential incident response, and (iii) the plurality of members does not include a second member satisfying the incident-response member availability requirement;

increasing a security compromise threshold used for determining whether to allow the participation of the at least one communication device in the group call;

wherein restricting or allowing comprises one of:

allowing the participation of the at least one communication device in the group call when the security information for the at least one communication device includes a security compromise score that does not exceed the increased security compromise threshold, or restricting the participation of the at least one communication device in the group call when the security information for the at least one communication device includes a security compromise score that exceeds the increased security compromise threshold.

17. A talkgroup server, comprising:

a communications interface; and an electronic processor communicatively coupled to the communications interface, the electronic processor configured to:

receive, via the communications interface, security information associated with a plurality of communication devices that are each operated by a respective one of a plurality of members of a talk group;

determine that the security information indicates that the security of at least one communication device from the plurality of communication devices is compromised;

receive, via the communications interface, a request to initiate a group call between the members of the talk group;

determine whether the request is associated with an incident assigned to the members of the talk group;

in response to determining that the request is associated with the incident assigned to the members of the talk group, obtain one or more incident-response communication requirements associated with responding to the incident, wherein the incident-response communication requirements include one or more of an incident-response criticality requirement, an incident-response confidentiality requirement, or an incident-response member availability requirement;

retrieve a security policy indicating that a particular one of the incident-response criticality requirement, the incident-response confidentiality requirement, or the incident-response member availability requirement should be prioritized over other incident-response communication requirements in determining whether to restrict or allow participation of security-compromised communication devices in a group call; and restrict or allow the participation of the at least one communication device in the group call established between the members of the talk group based at least in part on the incident-response communication requirements associated with responding to the incident and further based at least in part on prioritizing the particular one of the incident-response criticality requirement, the incident-response confidentiality requirement, or the incident-response member availability requirement over the other incident-response communication requirements.

18. A method of managing security-compromised communication devices in a talk group, the method comprising:

receiving, at a talkgroup server, security information associated with a plurality of communication devices that are each operated by a respective one of a plurality of members of a talk group, wherein the security information includes a security compromise score determined based on security vulnerabilities detected at the communication device;

determining, at the talkgroup server, that the security information indicates that the security of at least one communication device from the plurality of communication devices is compromised by determining that the security compromise score associated with the at least one communication device exceeds a security compromise threshold;

receiving, at the talkgroup server, a request to establish a group call between the members of the talk group;

determining, at the talkgroup server, whether the request is associated with any incident assigned to the members of the talk group;

in response to determining that the request is associated with an incident assigned to the members of the talk group, obtaining, at the talkgroup server, one or more incident-response communication requirements associated with responding to the incident; and restricting or allowing the participation of the at least one communication device in the group call established between the members of the talk group based at least in part on the incident-response communication requirements associated with responding to the incident.

19. The method of claim 18, The method of claim 1, wherein the incident-response communication requirements include one or more of an incident-response criticality requirement, an incident-response confidentiality requirement, or an incident-response member availability requirement, the method comprising:

retrieving a security policy indicating that a particular one of the incident-response criticality requirement, the incident-response confidentiality requirement, or the incident-response member availability requirement should be prioritized over other incident-response communication requirements in determining whether to restrict or allow participation of security-compromised communication devices in a group call, and wherein restricting or allowing the participation of the at least one communication device in the group call is further based at least in part on prioritizing the particular one of the particular one of the incident-response criticality requirement, the incident-response confidentiality requirement, or the incident-response member availability requirement over the other incident-response communication requirements.

* * * * *